United States Patent

Rebordosa

Patent Number: 5,668,496
Date of Patent: Sep. 16, 1997

[54] CIRCUIT ARRANGEMENT FOR LIMITING THE CURRENT TO BE SWITCHED OF AN ELECTRICAL LOAD

[75] Inventor: Antonio Rebordosa, Manresa, Spain

[73] Assignee: Braun Aktiengesellschaft, Kronberg, Germany

[21] Appl. No.: 432,965

[22] Filed: May 1, 1995

[30] Foreign Application Priority Data

May 5, 1994 [DE] Germany ............... 44 15 794.0

[51] Int. Cl.⁶ ............................................. H03K 17/725
[52] U.S. Cl. ............... 327/457; 327/324; 327/380; 327/396; 327/452; 323/320; 323/321; 323/323
[58] Field of Search ........................ 327/124, 309, 327/312, 313, 314, 323, 324, 325, 380, 452–476, 396; 323/323, 351, 319–326; 307/141; 318/778, 784, 786; 200/16 R, 550

[56] References Cited

U.S. PATENT DOCUMENTS

| | | | |
|---|---|---|---|
| 4,422,030 | 12/1983 | McAllise | 318/779 |
| 4,468,604 | 8/1984 | Zaderej | 318/786 |
| 4,591,781 | 5/1986 | Larson | 323/323 |
| 4,651,077 | 3/1987 | Woyski | 318/781 |
| 4,703,248 | 10/1987 | Kühnemundt et al. | 323/300 |
| 4,761,601 | 8/1988 | Zaderej | 318/786 |
| 4,935,691 | 6/1990 | Lamar | 323/323 |
| 5,019,770 | 5/1991 | Harada et al. | 323/282 |
| 5,430,637 | 7/1995 | Buck | 363/89 |

FOREIGN PATENT DOCUMENTS

| | | |
|---|---|---|
| 0 208 944 | 1/1987 | European Pat. Off. . |
| 36 01 862 | 7/1987 | Germany . |
| 481 580 | 12/1969 | Switzerland . |

Primary Examiner—Timothy P. Callahan
Assistant Examiner—Kenneth B. Wells
Attorney, Agent, or Firm—Fish & Richardson, P.C.

[57] ABSTRACT

A circuit arrangement for limiting the current to be switched of an electrical load, with the power input of the electrical load being controlled by means of a Triac, said Triac being connected in series with the electrical load, with a Diac being connected to the gate terminal of the Triac, said Diac being connected in series with a resistor arrangement whose resistance value is variable for the purpose of controlling the Triac, said Triac being disconnectible from the power supply by means of a first switch, wherein a second switch is provided by means of which the series arrangement comprised of the resistor arrangement and the Diac is disconnectible from the power supply, and wherein, on turning the electrical load on, the first switch is closed first, while the second switch is closed with a time delay. Advantageously, on turning the electrical load off, the second switch is opened first, while opening of the first switch occurs with a time delay.

4 Claims, 2 Drawing Sheets

CIRCUIT ARRANGEMENT FOR LIMITING THE CURRENT TO BE SWITCHED OF AN ELECTRICAL LOAD

FIELD OF THE INVENTION

This invention relates to a circuit arrangement for limiting the current to be switched to an electrical load.

BACKGROUND OF THE INVENTION

From DE 36 01 862 C2 a prior-art circuit arrangement is known in which an electric motor connected to an A.C. supply is controlled by means of a Triac. In this arrangement, control is effected such that a Diac with a resistance network is connected to the gate terminal of the Triac, with the value of this resistance network being user-adjustable. By altering the resistance value, the power input of the electric motor is controlled in such a fashion that in the presence of a smaller resistance the electric motor accepts a higher power than in the presence of a greater resistance. In order to limit the starting current when the electrical load is switched on, it is provided that the electric motor has only a low power input when switched on. To accomplish this, it is provided that in the startup phase of the electric motor the full resistance value is connected in the series arrangement with the Diac. Only when startup of electric motor is completed, the motor then fulfilling a specified minimum function, will this full resistance value be bypassed such that the resistance value set by the user is connected to the Diac. The result thereby achieved is that the electric motor can start up with a low power input only, that is, at a low starting current. In the prior-art specification referred to, the fulfillment of the minimum function of the electric motor is derived from the fact that the electric motor involved is the motor of a vacuum cleaner and that a pressure sensor is provided which senses the differential pressure of the delivery side to the suction side of the electric motor, enabling the full resistance to be by-passed by the resistance value set by the user in dependence upon the sensor signal.

It is an object of the present invention to limit currents to be switched to an electrical load reliably with a minimum possible complexity of components.

SUMMARY OF THE INVENTION

In the circuit arrangement of the claimed invention, a current of some milliamperes flows in the circuit of the resistance network and the Diac, whilst the current flowing through the electrical load and the Triac is of the order of magnitude of some amperes. In this circuit arrangement, it is accomplished in particular by the characterizing features thereof that the mechanical switch, by closing, is only required to switch the current flowing in the circuit of the resistance network and the Diac, that is, the mechanical switch switches only a current of the order of magnitude of some milliamperes. The actual switching of the current through the electrical cal (order of magnitude of some amperes) is effected in that the Triac is opened by its gate terminal being driven. At this instant, the mechanical switch of the circuit of the electrical load and the Triac is already closed. This means that the actual switching operation of the current through the electrical load occurs in the Triac. This avoids in an advantageous manner that a starting current of the order of magnitude of some amperes has to be switched by the mechanical switch.

In one embodiment, it shows that the current to be switched is also limitable as the electrical load is turned off.

As described above, only a current of some milliamperes is switched, which is accomplished in that the switch placed in the circuit of the resistance network and the Diac is opened first, with the switching of the current through the electrical load and the Triac being again performed in the Triac by the Triac going from the conducting to the non-conducting state. As the mechanical switch in the circuit of the electrical load and the Triac is opened, current has already stopped flowing in this circuit, that is, this circuit has already reached zero current when this mechanical switch is opened. Therefore, the mechanical switch switches again a current of some milliamperes only, that is, the current through the resistance network and the Diac.

In a particularly advantageous embodiment of the circuit arrangement, the current to be switched is limitable during both the turn-on and the turn-off operations of the electrical load.

The circuit arrangement, in one embodiment, can produce the beneficial effect that the time sequence of the two switching operations is performed automatically by the user executing a single operation. As this occurs, the operator control means is moved from the position in which its contact lugs engage the non-conducting portions of the conductors, into the position in which the contact lugs of the operator control means engage the respective conducting portions of the individual conductors.

In contrast to prior art arrangements, it becomes apparent from all these embodiments of the circuit arrangement that they advantageously dispense with the need for a sensor for detecting the startup of the electrical load.

One embodiment of the present invention will be described in more detail in the following with reference to the accompanying drawings.

DESCRIPTION OF THE PREFERRED EMBODIMENTS

Figure 1:
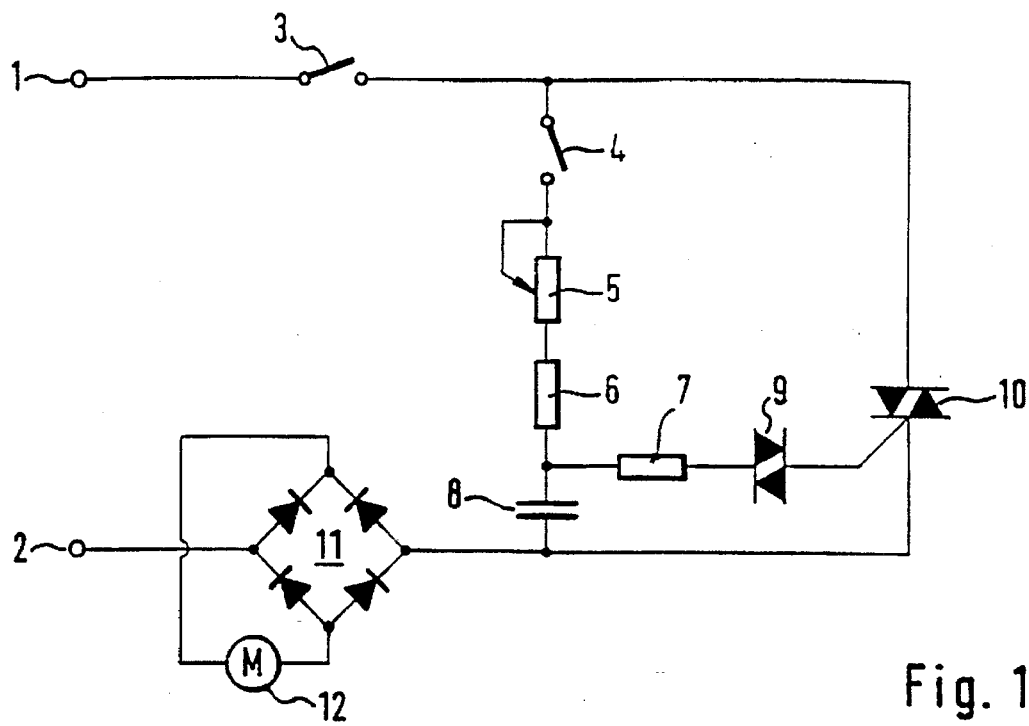
FIG. 1 is a diagram of a first circuit arrangement of the invention; and closing cycles of the respective switches plotted as FIGS. 2 and 3 are graphs illustrating the opening a function of time.

Referring now to FIG. 1 of the drawings, a first switch 3 is connected to a line terminal 1. Connected to this first switch 3 is a parallel arrangement comprised of a Triac 10 in the one branch and a second switch 4 with a resistor arrangement 5, 6 whose resistance value is variable in the other branch. As shown, a capacitor 8 is connected to the resistors 5, 6. Connected to the junction of the resistor 6 and the capacitor 8 is a resistor 7 to which a Diac 9 is connected which has its other terminal connected to the gate of the Triac 10. This circuit arrangement known per se serves the function of controlling the power input of an electrical load by varying the resistance value and thereby operating on the gate of the Triac correspondingly. This parallel arrangement described is connected to a terminal of a rectifier arrangement 11 having its other terminal connected to the second line terminal 2. The outputs of the rectifier arrangement 11 are connected to an electric motor 12.

Figure 2:
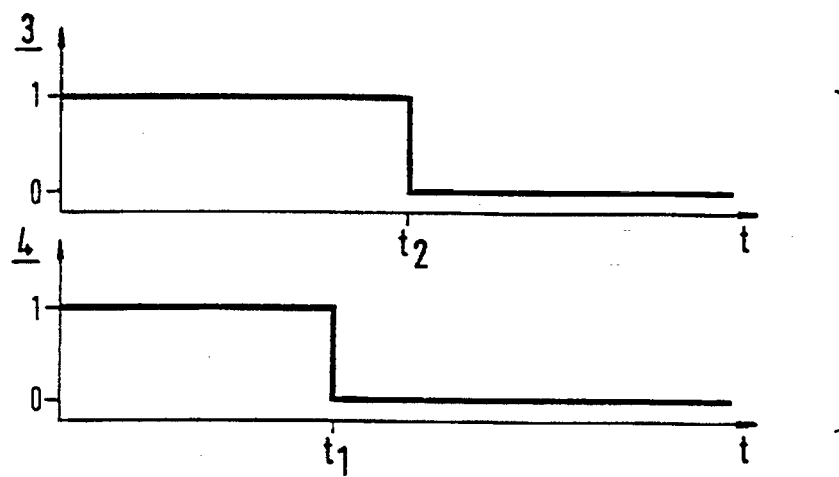

FIG. 2 shows the relationships applying as the electrical load is turned off. According to the lower graph of FIG. 2, the second switch 4 is opened at the instant of time $t_1$, that is, current is prevented from flowing through the Diac 9, thus also preventing current flow to the gate of the Triac 10. At the instant of time $t_2$ which occurs later than the instant of time $t_1$, also the first switch 3 is opened. Because the Triac 10 is already non-conducting at this instant, the opening operation of the first switch 3 is performed at zero current.

Figure 3:
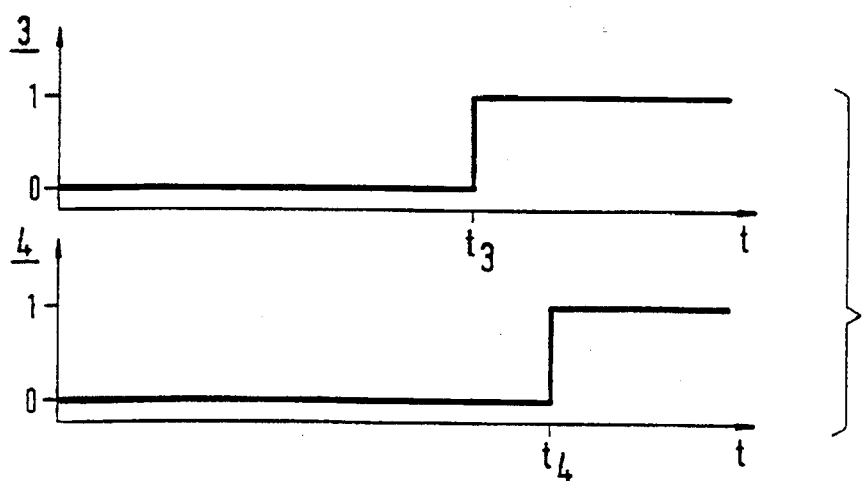

FIG. 3 shows the relationships that apply as the electrical load is turned on. The first switch 3 is first closed at the instant of time $t_3$, and the second switch 4 is closed with a time delay at the instant of time $t_4$. Because the Triac 10 is still non-conducting at the instant of time $t_3$, the entire closing operation of the first switch 3 occurs at zero current. This arrangement ensures that the mechanical switch is required to switch only a current of the order of magnitude of some milliamperes, which corresponds to the control current of the Triac 10. The current through the electrical load of the order of magnitude of some amperes is switched in that the Triac goes from its non-conducting state into conduction or from conduction into non-conduction. The first switch 3 is only opened or closed when this circuit is at zero current.

From this description it becomes apparent that it is not absolutely necessary for the first switch 3 to be arranged upstream of the parallel arrangement of FIG. 1. Rather, it is also possible to place the first switch 3 in the parallel path of the Triac 10 branch.

Figure 4:
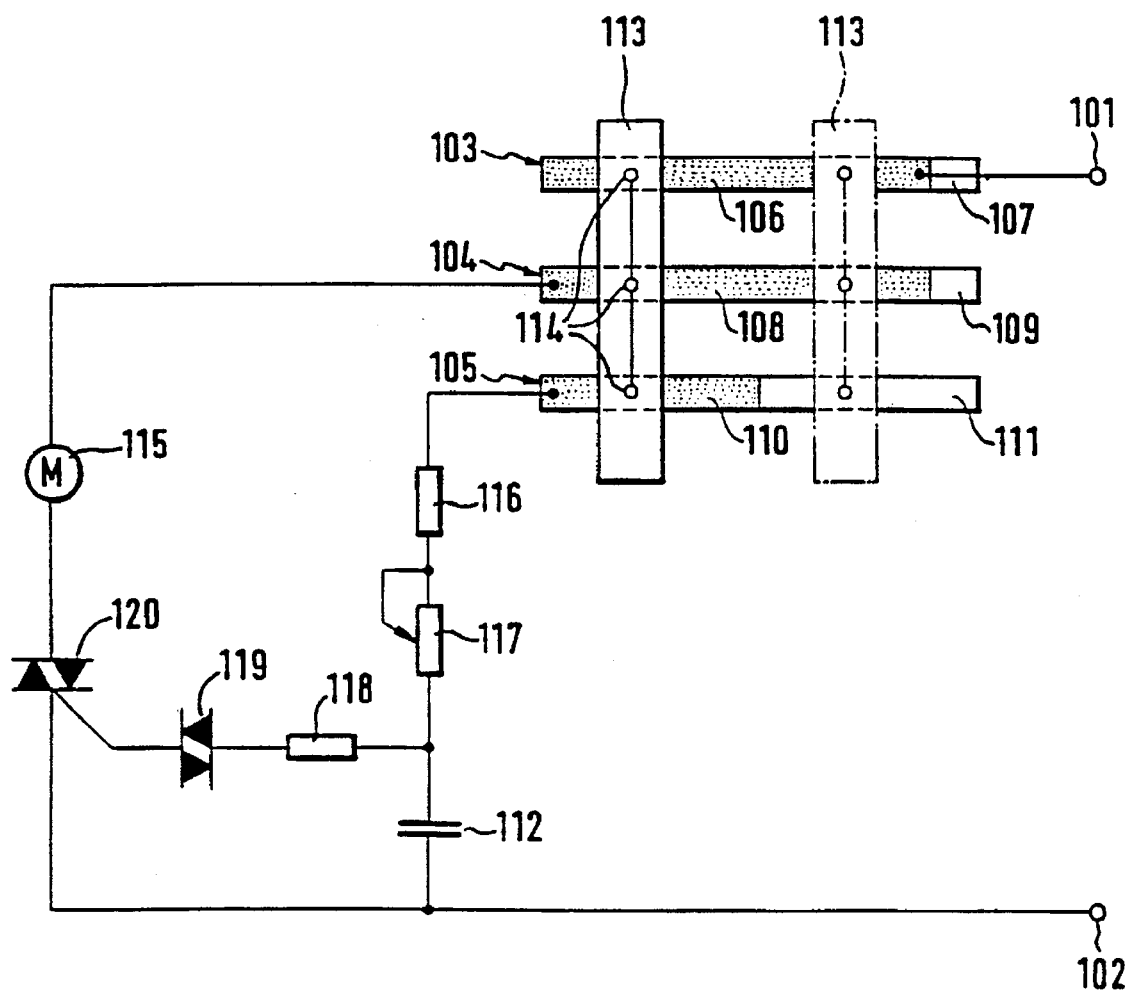
FIG. 4 is a view of an embodiment in which the two switches are combined in one switching device, thus enabling the function of the present invention, that is, the time sequence of the opening and closing operations of the two switches, to be performed by the operator executing a single operation.

FIG. 4 shows an embodiment of the circuit arrangement of the present invention in which the first and the second switch are configured in a particularly straightforward way. In this embodiment, the first switch is formed by conductors 103 and 104. The second switch is comprised of conductors 103 and 105. These conductors include each electrically conducting portions and nonconducting portions. Accordingly, the first conductor 103 comprises a conducting portion 106 and a nonconducting portion 107. The second conductor 104 has a conducting portion 108 and a non-conducting portion 109. The third conductor 105 includes a conducting portion 110 and a non-conducting portion 111. As illustrated in FIG. 4, these conductors are arranged essentially parallel to each other. In the first and the second conductor 103, 104, the non-conduction portions 107, 109 are of approximately equal length and arranged adjacent to each other. In the third conductor 105, the non-conducting portion 111 is appreciably longer than the non-conducting portions 107 and 109 of the first and the second conductor 103 and 104, respectively. The electrically conducting portion 106 of the first conductor 103 is electrically connected to a line terminal 101. The conducting portion 108 of the second conductor 104 is connected to the electrical load, which is an electric motor 115 in the present embodiment, as well as to a Triac 120. The electrically conducting portion 110 of the third conductor 105 is connected to a resistor arrangement 116, 117 in which the resistance value of resistor 117 is variable, as well as to a capacitor 112. The other terminal of the capacitor 112 as well as the Triac 120 are connected to the second line terminal 102. Connected to the junction of the variable resistor 117 and the capacitor 112 is a resistor 118 which in turn is connected to a Diac 119 having its output connected to the gate of the Triac 120. This arrangement serves to accomplish in a manner known per sea phase control of the Triac 120 in order to thus control the power input of the electric motor 115.

Further, an operator control means 113 is provided which extends transversely to and over the conductors 103, 104 and 105. Extending from this operator control means 113 are resilient lugs 114 engaging the conductors. In the operator control means 113, these lugs 114 make electrical contact with each other. The operator control means 113 is slidable along the conductors to the effect that such a sliding motion causes the electric motor 115 to be turned on or off. The Off position is reached when the operator control means 113 is in the extreme right-hand position when viewing FIG. 4, in which position the lugs 114 engage the non-conducting portions 107, 109 and 111 of the conductors 103, 104 and 105, respectively. The electrical load 115 is in the On state when the operator control means 113 is in the left-hand position when viewing FIG. 4, in which position the lugs 114 are in engagement with the conducting portions 106, 108 and 110 of the conductors 103, 104 and 105, respectively. As the device goes from the Off to the On state, an electrical connection is established first between the conducting portions 106 and 108 of the conductors 103 and 104. As shown in the Figure, as this closing operation proceeds, the lug 114 over the conductor 105 continues to engage the non-conducting portion 111 of the conductor 105, thus preventing electrical connection from being made between the first conductor 103 and the conductor 105. This means that the first switch comprised of conductor 103 and 104 is already closed at a time when the second switch comprised of conductors 103 and 105 is not closed as yet. Only as the closing operation proceeds still further, that is, with the operator control means being moved farther to the left, will also the second switch be closed. The overall effect achieved during this closing operation is that the first switch is closed before the second switch. As a result, when the first switch closes, current flow through the electrical load is not possible as yet because the Triac is not yet rendered conducting according to the assignment of its gate terminal. The closing operation of the first switch thus occurs at zero current. With the closing operation continuing, the second switch comprised of conductors 103 and 105 is closed. In accordance with the dimensioning of the resistors and the requisite control current at the Triac, a current of the order of magnitude of some milliamperes only is switched. In this case, switching of the current through the electrical load occurs in that the Triac 120 is placed from its non-conducting state in a conducting state, that is, the actual switching operation of the load current of the order of magnitude of some amperes occurs in the Triac. The relationships are precisely reverse for the turn-off operation. This involves movement of the operator control means 113 from its left-hand position when viewing FIG. 4 into its right-hand position. As this occurs, electrical contact between the conductors 103 and 105 is broken first, because the lug 114 on the conductor 105 reaches first the non-conducting portion 111 thereof. This causes the control current of the Triac of the order of magnitude of some milliamperes to be turned off. As a result, the Triac is cut off completely, thus preventing any further current flow through the electrical load 115. As the operator control means 113 continues its movement, the lug 114 reaches also the non-conducting portions 107 and 109 of the first and second conductors 103 and 104, respectively. As the first switch is thus opened, current has already stopped flowing through the electrical load 115, so that opening of this first switch occurs again at zero current. In the turn-off operation it thus results that the second switch is opened before the first switch. The configuration of the conductors is such that the nonconducting portion 111 of the third conductor 105 is some millimeters longer than the non-conducting portions 107 and 109 of the first and second conductors 103 and 104, respectively. In accordance with the speed at which the operator control means 113 is moved, this results in a time difference of the order of magnitude of some milliseconds on opening or closing of the first and the second switch.

As becomes apparent, opening of the first or the second switch will occur if at least one of the respective lugs 114 engages a non-conducting portion of the conductor. Therefore, it is also possible within the scope of this embodiment to configure, for example, the conductor 103 so that it comprises only the conducting portion 106 which then extends along the full length of the conductor 103. However, the provision of nonconducting portions 107, 109, 111 affords advantages with regard to safety. In the Off state, the operator control means 113 then has no voltage connection via the lugs 114.

I claim:

1. A circuit for controlling the current supplied from a power supply to an electrical load, said circuit comprising a Triac which controls a power input to the electrical load, said Triac including a gate terminal, said Triac being connected in series between the power supply and the electrical load, a Diac connected to the gate terminal of the Triac, a resistor network having a variable resistance value which controls a conducting state of the Triac, said resistor network connected in series between the power supply and the Diac, a first switch which disconnects said Triac from the power supply, and a second switch which disconnects the resistor network and the Diac from the power supply, said first and second switches implemented by three conductors arranged essentially parallel to each other, each of said conductors comprising a respective conducting portion and a respective non-conducting portion wherein the conducting portion of the first conductor is connected to a terminal of the power supply, the conducting portion of the second conductor is connected to the series arrangement comprised of the Triac and the electrical load, wherein the non-conducting portions of the first and the second conductor are positioned alongside each other and are of approximately equal length, with the conducting portion of the third conductor being connected to the resistor network and the Diac, the non-conducting portion of the third conductor being of a length greater than the non-conducting portions of the first and the second conductor, so that a section of the non-conducting portion of the third conductor is positioned alongside a section of the conducting portions of the first and the second conductor, and an operator-controlled device is provided which extends essentially transversely to and over the conductors and is slidable along said conductors, said operator-controlled device including respective lugs, each extending from said operator control device and each resiliently engaging a respective conductor, with the lugs making electrical contact with each other through the operator-controlled device.

2. The circuit as claimed in claim 1 further comprising a controller which opens the second switch and, following a predetermined time delay, opens the first switch so that current from the power supply to the electrical load is discontinued.

3. The circuit as claimed in claim 2 wherein said controller closes the first switch and, following a predetermined time delay, closes the second switch so that current from the power supply is supplied to the electrical load.

4. The circuit as claimed in claim 1 further comprising a controller which closes the first switch and, following a predetermined time delay, closes the second switch so that current from the power supply is supplied to the electrical load.

\* \* \* \* \*

UNITED STATES PATENT AND TRADEMARK OFFICE
CERTIFICATE OF CORRECTION

PATENT NO.   : 5,668,496
DATED        : September 16, 1997
INVENTOR(S)  : Antonio Rebordosa It is certified that error appears in the above-identified patent and that said Letters Patent is hereby corrected as shown below:

Column 1, line 57, after "cal" insert --load--.

Col. 2, l. 38, delete "and closing cycles of the respective switches plotted as", then start new paragraph.

Col. 2, l. 41 insert before "a" --and closing cycles of the respective switches plotted as--.

Signed and Sealed this

Twenty-second Day of June, 1999

Attest:

Q. TODD DICKINSON

Attesting Officer     Acting Commissioner of Patents and Trademarks